(12) United States Patent
Momo et al.

(10) Patent No.: US 12,092,598 B2
(45) Date of Patent: Sep. 17, 2024

(54) HEATING DEVICE STATE MONITORING METHOD AND STATE MONITORING SYSTEM

(71) Applicant: NIPPON ELECTRIC GLASS CO., LTD., Otsu (JP)

(72) Inventors: Daisuke Momo, Otsu (JP); Fumihiro Takahashi, Otsu (JP); Ippei Imoto, Otsu (JP)

(73) Assignee: NIPPON ELECTRIC GLASS CO., LTD., Otsu (JP)

( * ) Notice: Subject to any disclaimer, the term of this patent is extended or adjusted under 35 U.S.C. 154(b) by 125 days.

(21) Appl. No.: 17/774,274

(22) PCT Filed: Oct. 21, 2020

(86) PCT No.: PCT/JP2020/039552
§ 371 (c)(1),
(2) Date: May 4, 2022

(87) PCT Pub. No.: WO2021/095462
PCT Pub. Date: May 20, 2021

(65) Prior Publication Data
US 2022/0390404 A1 Dec. 8, 2022

(30) Foreign Application Priority Data

Nov. 14, 2019 (JP) ................... 2019-206283

(51) Int. Cl.
*G01N 27/20* (2006.01)
(52) U.S. Cl.
CPC .................... *G01N 27/20* (2013.01)
(58) Field of Classification Search
CPC .................................................. G01N 27/20
See application file for complete search history.

(56) References Cited

U.S. PATENT DOCUMENTS

2008/0164822 A1 7/2008 Serebryanov et al.
2011/0133742 A1 6/2011 Serebryanov et al.
(Continued)

FOREIGN PATENT DOCUMENTS

JP 2008-270164 A 11/2008
JP 2013-035724 A 2/2013

OTHER PUBLICATIONS

International Search Report for PCT/JP2020/039552 mailed Dec. 8, 2020, all pages.

*Primary Examiner* — Feba Pothen
(74) *Attorney, Agent, or Firm* — Kilpatrick Townsend & Stockton LLP

(57) ABSTRACT

Disclosed are state monitoring method and system for a heating device including a conductive path that electrically series-connects heating elements. The method includes obtaining a potential difference of a conductive path portion including at least one of the heating elements, obtaining monitoring information used to monitor a state of the heating elements, and determining occurrence of an anomaly in the conductive path portion based on the obtained monitoring information. The step of obtaining the potential difference includes obtaining a first potential difference of a first conductive path portion and obtaining a second potential difference of a second conductive path portion that differs from the first conductive path portion. The monitoring information includes comparison information obtained by comparing potential differences including the first potential difference and the second potential difference.

7 Claims, 2 Drawing Sheets

(56) References Cited

U.S. PATENT DOCUMENTS

2011/0192211 A1\* 8/2011 Yokoi ................ G01N 27/4163
  73/1.06
2016/0341419 A1\* 11/2016 Fluhrer .................... H05B 3/03

\* cited by examiner

HEATING DEVICE STATE MONITORING METHOD AND STATE MONITORING SYSTEM

TECHNICAL FIELD

The present invention relates to a heating device state monitoring method and a state monitoring system.

BACKGROUND ART

A heating device including a conductive path electrically connecting heating elements may be used to heat, for example, a heating subject such as a glass raw material, molten glass, or the like (Patent Document 1). Patent Document 1 discloses a method for inspecting the heating elements for damage. The method includes a step that determines the state of the heating elements based on an electric resistance change rate calculated from the total electric resistance value of the heating elements.

PRIOR ART LITERATURE

Patent Literature

Patent Document 1: Japanese Laid-Open Patent Publication No. 2013-035724

SUMMARY OF THE INVENTION

Problems that the Invention is to Solve

When controlling the temperature of the heating device, which includes the electrically series-connected heating elements as described above, based on the temperature of the heating subject and the ambient temperature around the heating subject, the electric resistance of each heating element changes over time as the output of temperature control changes and the temperature of the heating subject changes. Thus, the use of the electric resistance change rate, which is calculated from the total electric resistance value of the heating elements, to monitor the state of the heating elements hinders, for example, the further accurate detection of spark generated in a heating element and recognition of details such as spark generation precursory indications of heating element.

The present invention is made in view of such circumstances, and it is an objective of the present invention to provide a heating device state monitoring method and a state monitoring system that allow the state of the heating device including electrically series-connected heating elements to be monitored in a preferred manner.

Means for Solving the Problems

A heating device state monitoring method is provided to achieve the above-described objective. The heating device includes a conductive path that electrically series-connects heating elements and a power supply that supplies power to the conductive path. The method includes a potential difference acquisition step that obtains a potential difference of a conductive path portion including at least one of the heating elements, a monitoring information acquisition step that obtains monitoring information used to monitor a state of the heating elements, and an anomaly determination step that determines occurrence of an anomaly in the conductive path portion based on the monitoring information obtained in the monitoring information acquisition step. The potential difference acquisition step includes a first potential difference acquisition step that obtains a first potential difference of a first conductive path portion and a second potential difference acquisition step that obtains a second potential difference of a second conductive path portion that differs from the first conductive path portion. The monitoring information obtained in the monitoring information acquisition step includes comparison information obtained by comparing potential differences including the first potential difference and the second potential difference.

With this method, the monitoring information acquisition step obtains the comparison information as the monitoring information. Thus, changes in the state of the heating element included in the first conductive path portion or the second conductive path portion are recognized as relative changes between the first potential difference and the second potential difference. Thus, even when the temperature of the heating device is controlled so that the electric resistance values of the heating elements change over time, changes are easily recognized in the state of a heating element included in the first conductive path portion or the second conductive path portion. In the anomaly determination step, the occurrence of an anomaly in the conductive path portion is easily determined based on the comparison information obtained as monitoring information.

In the heating device state monitoring method, preferably, one of the first conductive path portion and the second conductive path portion includes two or more of the heating elements.

In the heating device state monitoring method, more preferably, the first conductive path portion and the second conductive path portion each include two or more of the heating elements.

With this method, the monitoring information acquisition step obtains the monitoring information based on the potential difference of each conductive path portion including two or more heating elements. Thus, the monitoring information is less complicated than when the monitoring information is obtained based on the potential difference of each of the heating elements.

In the heating device state monitoring method, the anomaly determination step may determine occurrence of an anomaly in the first conductive path portion or the second conductive path portion based on the comparison information obtained in the monitoring information acquisition step. The method may further include an individual potential difference acquisition step that obtains an individual potential difference of each of the heating elements included in the first conductive path portion or the second conductive path portion that is determined as being anomalous in the anomaly determination step; and an identification step that identifies a heating element that needs to be replaced or repaired based on the potential differences of the heating elements obtained in the individual potential difference acquisition step.

This method allows for efficient replacement or repair of the heating element.

In the heating device state monitoring method, the anomaly determination step may determine whether there is spark generation precursory indication in any one of the heating elements of the first conductive path portion and the second conductive path portion.

This method prevents the heating element from breaking caused by a generated spark.

In the heating device state monitoring method, in the anomaly determination step, the first potential difference of the first conductive path portion that is obtained in advance may be set as a first initial potential difference, the second potential difference of the second conductive path portion that is obtained in advance may be set as a second initial potential difference, and initial comparison information, obtained by comparing initial potential differences including the first initial potential difference and the second initial potential difference, may be compared with the comparison information obtained in the monitoring information acquisition step to determine occurrence of an anomaly in the conductive path portion.

With this method, the determination of the occurrence of an anomaly in the conductive path portion is performed considering differences in the initial performance of the heating elements resulting from, for example, the tolerance allowed for the heating elements.

In the heating device state monitoring method, the heating device may be used to heat glass.

This method reduces maintenance work of a glass manufacturing facility and improves the quality of glass.

In a state monitoring system for a heating device, the heating device includes a conductive path that electrically series-connects heating elements and a power supply that supplies power to the conductive path. The state monitoring system includes a potential difference acquisition unit that obtains a potential difference of a conductive path portion including at least one of the heating elements, a monitoring information acquisition unit that obtains monitoring information used to monitor a state of the heating elements, and an anomaly determination unit that determines occurrence of an anomaly in the conductive path portion based on the monitoring information obtained by the monitoring information acquisition unit. The potential difference acquisition unit includes a first potential difference acquisition unit that obtains a first potential difference of a first conductive path portion and a second potential difference acquisition unit that obtains a second potential difference of a second conductive path portion that differs from the first conductive path portion. The monitoring information obtained by the monitoring information acquisition unit includes comparison information about potential differences including the first potential difference and the second potential difference.

Effect of the Invention

The present invention succeeds in monitoring the state of the heating device including electrically series-connected heating elements in a preferred manner.

MODES FOR CARRYING OUT THE INVENTION

A heating device state monitoring method and a state monitoring system according to one embodiment will now be described with reference to the drawings. The drawings may show structures in an exaggerated or simplified manner to facilitate understanding. Further, structures may not depict actual scale.

State Monitoring System

Figure 1:
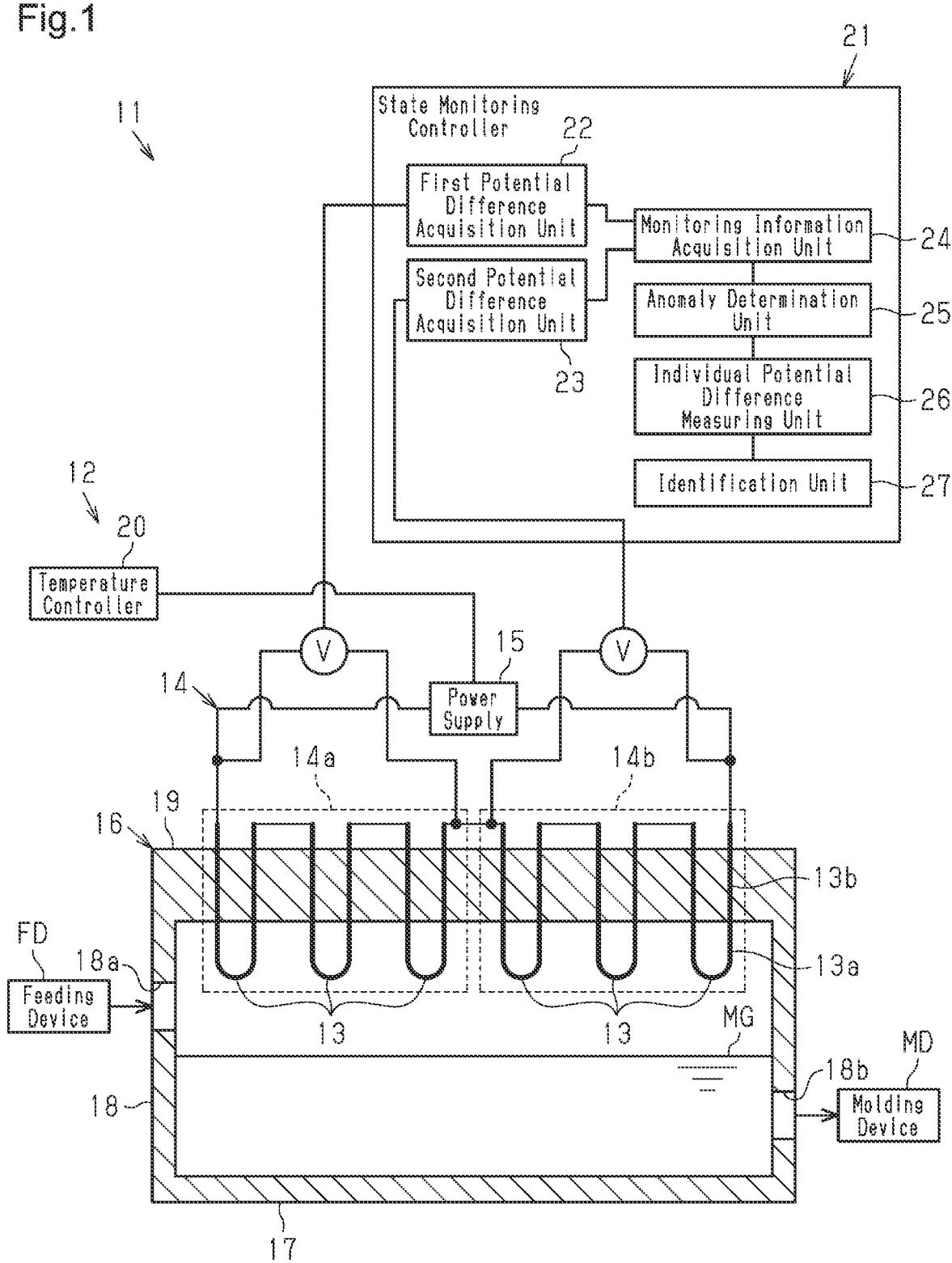
FIG. 1 is a schematic view showing a state monitoring system according to one embodiment.

As shown in FIG. 1, a state monitoring system 11 monitors the state of a heating device 12. The heating device 12 includes a conductive path 14 that electrically series-connects heating elements 13 and a power supply 15 that supplies power to the conductive path 14.

In the present embodiment, the heating device 12 that heats glass is described as an example. The heating device 12 also includes a melting furnace 16 that melts a glass raw material. The melting furnace 16 includes a bottom wall 17, a side wall 18, and an upper wall 19. The melting furnace 16 can be formed by refractories such as bricks or from platinum or a platinum alloy.

The side wall 18 of the melting furnace 16 includes an inlet 18a, through which a glass raw material is supplied into the melting furnace 16, and an outlet 18b, from which molten glass MG is discharged from the melting furnace 16. A feeding device FD supplies the glass raw material to the inlet 18a. The molten glass MG discharged from the outlet 18b is molded by a molding device MD located downstream from the melting furnace 16.

The heating elements 13 are attached to the upper wall 19 of the melting furnace 16. Each heating element 13 is a resistive heating element including a heating portion 13a that generates heat when energized and a non-heating portion 13b. The heating portion 13a of the heating element 13 is located in the melting furnace 16 and heats the glass raw material and the molten glass MG in the melting furnace 16. The heating portion 13a of the heating element 13 is located in the space above the molten glass MG. The heating portion 13a of the heating element 13 is used under an atmosphere containing volatile components of the molten glass MG.

The heating element 13 in the heating device 12 of the present embodiment has a U-shaped heating portion 13a. Nevertheless, the shape of the heating element 13 is not particularly limited. The heating portion 13a may be, for example, corrugated or rod-shaped. The non-heating portion 13b includes, for example, a terminal (not shown).

The material of the heating portion 13a in the heating element 13 may be, for example, molybdenum disilicide, molybdenum, graphite, silicon carbide, a nickel-chromium alloy, an iron-chromium-aluminum alloy, tungsten, platinum, zirconia, or lanthanum chromite.

The heating device 12 includes a temperature controller 20 that controls the power supplied to the conductive path 14. The temperature controller 20 performs feedback control based on the temperature measured by a temperature sensor (not shown). The measured temperature may be the temperature of the molten glass MG, which is the heating subject, the temperature of the wall of the melting furnace 16, or the temperature of the atmosphere in the melting furnace 16. The power supply 15 may be an alternating-current power supply or a direct-current power supply.

The conductive path 14 of the heating device 12 includes the heating elements 13 and a wire that electrically connects the heating elements 13. The conductive path 14 includes a first conductive path portion 14a and a second conductive path portion 14b that differs from the first conductive path portion 14a. In the first conductive path portion 14a of the present embodiment, three heating elements 13 are electrically connected in series. In the second conductive path portion 14b, three heating elements 13 are electrically connected in series.

The state monitoring system 11 includes a state monitoring controller 21. The state monitoring controller 21 includes a first potential difference acquisition unit 22 that obtains a first potential difference that is a potential difference at the first conductive path portion 14*a*, a second potential difference acquisition unit 23 that obtains a second potential difference that is a potential difference at the second conductive path portion 14*b*, and a monitoring information acquisition unit 24 that obtains monitoring information for monitoring the states of the heating elements 13. The first potential difference is the potential difference between the two ends of the first conductive path portion 14*a*. The heating elements 13 of the first conductive path portion 14*a* are all arranged between the two ends of the first conductive path portion 14*a*. The second potential difference is the potential difference between the two ends of the second conductive path portion 14*b*. The heating elements 13 of the second conductive path portion 14*b* are all arranged between the two ends of the second conductive path portion 14*b*. The monitoring information obtained by the monitoring information acquisition unit 24 is comparison information about potential differences including the first potential difference and the second potential difference.

Figure 2:
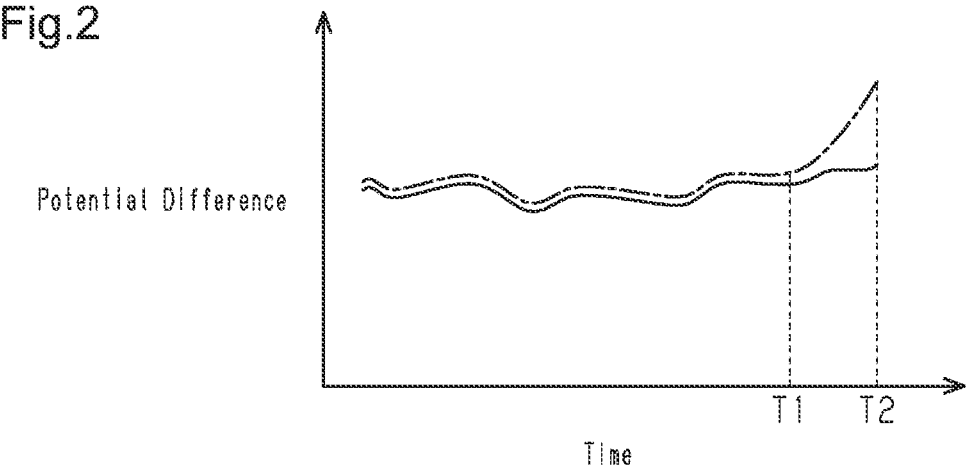
FIG. 2 is a graph showing the relationship between time and potential differences.

FIG. 2 is a graph illustrating an example of the comparison information obtained by the monitoring information acquisition unit 24 in which the first potential difference is indicated by the solid line and the second potential difference is indicated by the long-dash short-dash line using a common time axis. The temperature of the heating device 12 is controlled by the temperature controller 20. Thus, the first potential difference and the second potential difference change over time. In this case, when the level of deterioration is low in the heating elements 13 of the first conductive path portion 14*a* and the second conductive path portion 14*b*, the first potential difference and the second potential difference resulting from the temperature control behave in substantially the same manner. In contrast, when deterioration advances in, for example, one of the heating elements 13 of the second conductive path portion 14*b*, the second potential difference will have a tendency to be relatively high as compared with the first potential difference.

In the graph shown in FIG. 2, among the first potential difference and the second potential difference, the second potential difference has a tendency to become relatively high from time T1. Thus, it can be presumed that deterioration advanced at a high rate in one of the heating elements 13 of the second conductive path portion 14*b* from time T1. Further, the difference between the first potential difference and the second potential difference increases over time. Thus, it can be presumed that deterioration of the heating element 13 is advancing. Then, at time T2 shown in FIG. 2, a spark generated in the heating element 13 of the second conductive path portion 14*b* breaks the heating element 13. A person managing the heating device 12 will be able to recognize spark generation precursory indications of the heating element 13 by monitoring the comparison information.

The state monitoring controller 21 of the present embodiment further includes an anomaly determination unit 25 that determines whether the first conductive path portion 14*a* or the second conductive path portion 14*b* is anomalous based on the comparison information obtained by the monitoring information acquisition unit 24. The state monitoring controller 21 also includes an individual potential difference acquisition unit 26 and an identification unit 27. The individual potential difference acquisition unit 26 obtains individual potential difference of each heating element 13 included in the first conductive path portion 14*a* or the second conductive path portion 14*b* that is determined as being anomalous by the anomaly determination unit 25. The identification unit 27 identifies the heating element 13 that needs to be replaced or repaired based on the individual potential difference of each heating element 13 obtained in an individual potential difference acquisition step. The individual potential difference acquisition unit 26 obtains potential difference of each heating element 13, more specifically, the potential difference between the ends of the heating element 13 with a potential difference measuring device (not shown). The identification unit 27 uses a predetermined threshold value to identify a heating element 13 that has a potential difference anomaly.

The state monitoring controller 21 can be formed by a processor, memory, software, and an image display device (not shown).

State monitoring method for heating device 12

Figure 3:
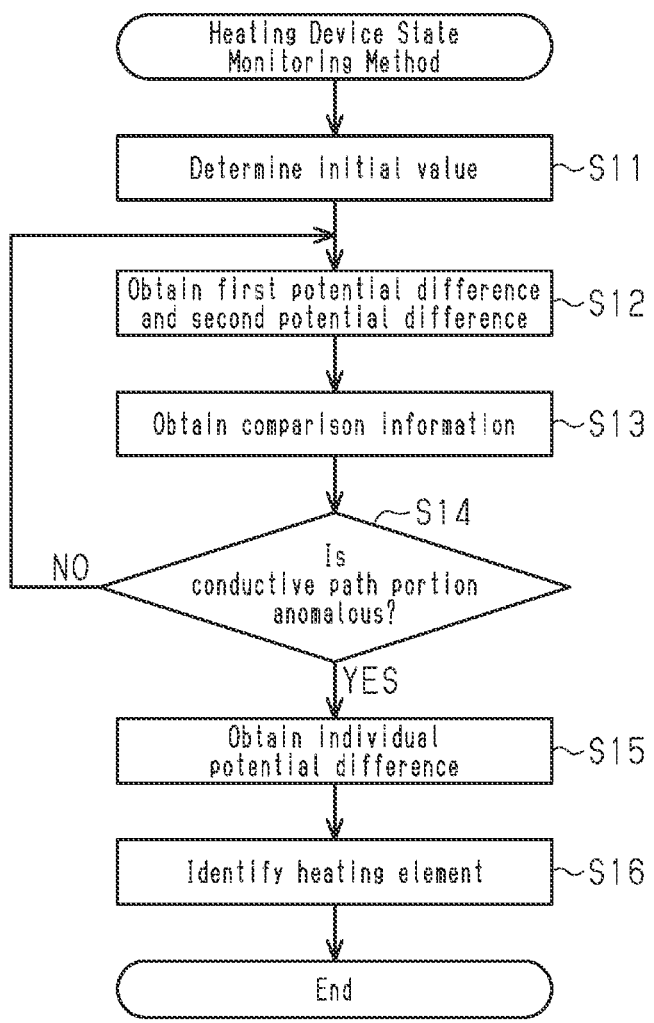
FIG. 3 is a flowchart of a heating device state monitoring method.

A state monitoring method for the heating device 12 will now be described with reference to the flowchart shown in FIG. 3.

The state monitoring method for the heating device 12 includes an initial value determination step (step S11) that determines an initial value of a potential difference, a potential difference acquisition step (step S12) that obtains the potential difference of a conductive path portion including at least one heating element 13, and a monitoring information acquisition step (step S13) that obtains monitoring information used to monitor the state of the heating element 13.

In the initial value determination step, or step S11, the first potential difference, which is obtained in advance, is set as a first initial potential difference. The second potential difference, which is obtained in advance, is set as a second initial potential difference. Initial comparison information is obtained by comparing the first initial potential difference with the second initial potential difference. The initial comparison information may be a ratio of the first initial potential difference to the sum of the first initial potential difference and the second initial potential difference and a ratio of the second initial potential difference to the sum of the first initial potential difference and the second initial potential difference. Alternatively, the initial comparison information may be a ratio of the first initial potential difference to the second initial potential difference or the difference between the first initial potential difference and the second initial potential difference.

In the initial value determination step, or step S11, preferably, the first initial potential difference and the second initial potential difference are obtained after the temperature of the heating subject heated by the heating device 12 becomes stable. For example, in the initial value determination step, or step S11, of the present embodiment, preferably, the temperature controller 20 controls the heating device 12 until the temperature of the molten glass MG in the melting furnace 16 becomes stable, and the first initial potential difference and the second initial potential difference are obtained when the temperature of the molten glass MG reaches a predetermined temperature range within a fixed time.

After the initial value determination step, or step S11, the temperature of the heating device 12 is controlled continuously to heat the glass raw material and the molten glass MG in the melting furnace 16.

The initial value determination step, or step S11, can be performed by the first potential difference acquisition unit 22, the second potential difference acquisition unit 23, and the monitoring information acquisition unit 24.

In the potential difference acquisition step, or step S12, the first potential difference acquisition unit 22 obtains the first potential difference, and the second potential difference acquisition unit 23 obtains the second potential difference. In the monitoring information acquisition step, or step S13, the monitoring information acquisition unit 24 obtains the comparison information. The comparison information may be a ratio of the first potential difference to the sum of the first potential difference and the second potential difference and a ratio of the second potential difference to the sum of the first potential difference and the second potential difference. Alternatively, the comparison information may be a ratio of the first potential difference to the second potential difference or the difference between the first potential difference and the second potential difference. When the comparison information is changed in this manner, the initial comparison information described above may be changed in the same manner.

The state monitoring method for the heating device 12 further includes an anomaly determination step (step S14), an individual potential difference acquisition step (step S15), and an identification step (step S16).

In the anomaly determination step, or step S14, the occurrence of an anomaly in the first conductive path portion 14a or the second conductive path portion 14b is determined based on the comparison information obtained in the monitoring information acquisition step. In the anomaly determination step, or step S14, of the present embodiment, the occurrence of an anomaly is determined based on each ratio determined in the initial value determination step, or step S11. Specifically, in the anomaly determination step, or step S14, a threshold value is also determined based on each ratio determined in the initial value determination step, or step S11, and the threshold value is used to perform anomaly determination.

In the anomaly determination step, or step S14, when, for example, the second conductive path portion 14b is determined as being anomalous (step S14: YES), the process proceeds to the individual potential difference acquisition step, or step S15. In the anomaly determination step, or step S14, when the occurrence of an anomaly is not determined (step S14: NO), the potential difference acquisition step, or step S12, is repeated. In the anomaly determination step, or step S14, whether there is spark generation precursory indication in any of the heating elements 13 in the first conductive path portion 14a and the second conductive path portion 14b can be determined. Specifically, in the anomaly determination step, or step S14, safety is considered when setting the threshold value so that the occurrence of an anomaly can be determined before a heating element 13 generates a spark.

In the individual potential difference acquisition step, or step S15, the individual potential difference is obtained for each heating element 13 included in the second conductive path portion 14b that is determined as being anomalous in the anomaly determination step, or step S14. For example, when determined as being anomalous in step S14, the individual potential difference of each heating element 13 may be obtained by measuring the potential difference between the two ends of the heating element 13 using a potential difference measuring device attached to the heating element 13. In the identification step, or step S16, the heating element 13 that needs to be replaced or repaired is identified based on the individual potential difference of each heating element 13 obtained in the individual potential difference acquisition step, or step S15.

Specifically, in the identification step, or step S16, for example, the initial potential difference, which is the potential difference of each heating element 13 obtained in advance in the initial value determination step, or step S11, is compared with the potential difference of the heating element 13 obtained in the individual potential difference acquisition step, or step S15. In the initial value determination step, or step S11, for example, a ratio of the initial potential difference of each heating element 13 to the sum of the initial potential differences of the heating elements 13 is calculated. In the individual potential difference acquisition step, or step S15, for example, a ratio of the potential difference of each heating element 13 to the sum of the potential differences of the heating elements 13 is calculated.

In the identification step, or step S16, the threshold value determined based on the ratio of each heating element 13, which is calculated in the initial value determination step, or step S11, is used to identify a heating element 13 that has an anomaly in the potential difference. A notification unit notifies the manager of the heating device 12 that the heating element 13 identified in the identification step, or step S16, needs to be replaced or repaired. The notification unit may be an image display device. Specifically, the image display device can easily notify the manager of the heating device 12 of an anomaly by displaying numbers assigned in advance to the heating elements 13 or symbols or the like that identify specific heating elements 13 in a schematic diagram of the heating elements 13.

As described above, the state monitoring method identifies the heating element 13 that needs to be replaced or repaired based on, for example, spark generation precursory indications of a heating element 13. This prevents the heating element 13 from being broken by a spark. Thus, the state monitoring method prevents fragments of a heating element 13 from falling that would occur when the heating element 13 breaks. Thus, there will be no need to collect such fragments of the heating element 13. Further, the present embodiment prevents fragments of the heating element 13 from mixing with the molten glass MG and avoids problems that would be caused by the fragments of the heating element 13 mixing with the molten glass MG.

In the anomaly determination step, or step S14, it is determined which one of the first conductive path portion 14a and the second conductive path portion 14b has an anomaly and then it is determined which one of the heating elements 13 has an anomaly in the first conductive path portion 14a or the second conductive path portion 14b determined as being anomalous. Thus, there is no need to constantly measure the individual potential difference of each heating element 13. This reduces the load on the state monitoring controller 21.

The operation and advantages of the present embodiment will now be described.

(1) The heating device 12 includes the conductive path 14 that electrically series-connects the heating elements 13 and the power supply 15 that supplies power to the conductive path 14. The state monitoring method for the heating device 12 includes the potential difference acquisition step (step S12) that obtains the potential difference of a conductive path portion including at least one of the heating elements, and the monitoring information acquisition step (step S13) that obtains the monitoring information used to monitor the states of the heating elements 13. The state monitoring method for the heating device 12 further includes the anomaly determination step (step S14) that determines whether the conductive path portion is anomalous from the monitoring information obtained in the monitoring information acquisition step, or step S13.

The potential difference acquisition step, or step S12, includes the first potential difference acquisition step that obtains the first potential difference of the first conductive path portion 14*a* and the second potential difference acquisition step that obtains the second potential difference of the second conductive path portion 14*b*, which differs from the first conductive path portion 14*a*. The monitoring information obtained in the monitoring information acquisition step, or step S13, includes the comparison information obtained by comparing potential differences including the first potential difference and the second potential difference.

With this method, in the monitoring information acquisition step, or step S13, the process obtains the comparison information as the monitoring information. Thus, changes in the state of the heating element 13 included in the first conductive path portion 14*a* or the second conductive path portion 14*b* are recognized as relative changes between the first potential difference and the second potential difference. Thus, even when the temperature of the heating device 12 is controlled so that the electric resistance values of the heating elements 13 change over time, changes are easily recognized in the state of a heating element 13 included in the first conductive path portion 14*a* or the second conductive path portion 14*b*. Accordingly, the state of the heating device 12 including the electrically series-connected heating elements 13 is monitored in a preferred manner. In the anomaly determination step, or step S14, the occurrence of an anomaly in the conductive path portion is easily determined based on the comparison information obtained as monitoring information.

(2) The first conductive path portion 14*a* and the second conductive path portion 14*b* of the heating device 12 each include two or more heating element 13. In this case, the monitoring information acquisition step, or step S13, obtains the monitoring information based on the potential difference of each conductive path portion including two or more heating elements 13. Thus, the monitoring information is less complicated than when the monitoring information is obtained based on the potential difference of each of the heating elements 13. This reduces the load when obtaining the monitoring information about four or more heating elements 13 that are electrically connected in series.

(3) In the anomaly determination step, or step S14, the process determines which one of the first conductive path portion 14*a* and the second conductive path portion 14*b* is anomalous from the comparison information obtained in the monitoring information acquisition step, or step S13. The state monitoring method for the heating device 12 further includes the individual potential difference acquisition step (step S15) that obtains the individual potential difference of each of the heating elements 13 included in the first conductive path portion 14*a* or the second conductive path portion 14*b* that is determined as being anomalous in the anomaly determination step, or step S14. The state monitoring method for the heating device 12 further includes the identification step (step S16) that identifies the heating element 13 that needs to be replaced or repaired based on the individual potential difference of the heating elements 13 obtained in the individual potential difference acquisition step, or step S15. This allows for efficient replacement or repair of the heating element 13.

(4) In the anomaly determination step, or step S14, the process preferably determines whether there is spark generation precursory indication in any one of the heating elements 13 of the first conductive path portion 14*a* and the second conductive path portion 14*b*. This prevents the heating element 13 from breaking caused by a generated spark.

(5) Preferably, in the anomaly determination step, or step S14, the initial comparison information, which is obtained by comparing the initial potential differences including the first initial potential difference and the second initial potential difference, is compared with the comparison information obtained in the monitoring information acquisition step, or step S13, to determine whether the conductive path portion is anomalous. In this case, the determination of the occurrence of an anomaly in the conductive path portion is performed considering differences in the initial performance of the heating elements 13 resulting from, for example, the tolerance allowed for the heating elements 13. This further increases the accuracy of anomaly determination.

(6) The heating device 12 when used for glass heating applications reduces maintenance work of a glass manufacturing facility and improves the quality of glass.

Modifications

The present embodiment may be modified as described below. The present embodiment and the following modifications can be combined as long as the combined modifications remain technically consistent with each other.

The initial value determination step, or step S11, may be omitted. Specifically, in the anomaly determination step, or step S14, the process may use a preset threshold value without using the ratios determined in the initial value determination step, or step S11.

In the anomaly determination step, or step S14, the process may determine whether a spark has been generated instead of determining whether there is spark generation precursory indication in a heating element 13.

The individual potential difference acquisition step, or step S15, and the identification step, or step S16, may be omitted. Instead, for example, when the second potential difference of the second conductive path portion 14*b* becomes greater than the first potential difference of the first conductive path portion 14*a*, all of the heating elements 13 of the second conductive path portion 14*b* may be replaced.

The quantity of the heating elements 13 included in the first conductive path portion 14*a* may be one or more. The quantity of the heating elements 13 included in the second conductive path portion 14*b* may also be one or more. Further, the quantity of the heating elements 13 included in the first conductive path portion 14*a* may be the same as or different from the quantity of the heating elements 13 included in the second conductive path portion 14*b*.

The conductive path 14 of the heating device 12 does not need to include only the two conductive path portions, namely, the first conductive path portion 14*a* and the second conductive path portion 14*b*. Instead, the conductive path 14 of the heating device 12 may include three or more conductive path portions. For example, in the potential difference acquisition step, or S12, the process may further obtain a third potential difference that is a potential difference at a third conductive path portion that differs from the first conductive path portion 14*a* and the second conductive path portion 14*b*, and the monitoring information obtained in the monitoring information acquisition step, or step S13, may be comparison information about potential differences including the first potential difference, the second potential difference, and the third potential difference.

The quantity of the conductive path 14 included in the heating device 12 does not need to be one. Instead, the heating device may include a plurality of conductive paths.

The monitoring information obtained in the monitoring information acquisition step, or step S13, does not need to be the comparison information obtained by directly comparing potential differences including the first potential difference and the second potential difference. Instead, the monitoring information may be comparison information obtained by comparing conversion values calculated by converting the first potential difference and the second potential difference.

The monitoring information obtained in the monitoring information acquisition step, or step S13, may include information such as the electric resistance value, the current value, or an accumulated actuation time of the heating elements 13 in addition to the above comparison information.

The heating device 12 does not have to heat glass in the melting furnace 16. The heating device may heat molten glass at any portion of a manufacturing device for glass articles such as a melting basin or a passage between the melting furnace 16 and the molding device. The heating device may heat heating subjects other than glass. Examples of such non-glass heating subjects include metal and ceramic raw materials.

REFERENCE SIGNS LIST

11: state monitoring system, 12: heating device, 13: heating element, 14: conductive path, 14a: first conductive path portion, 14b: second conductive path portion, 15: power supply, 22: first potential difference acquisition unit, 23: second potential difference acquisition unit, 24: monitoring information acquisition unit, 25: anomaly determination unit, MG: molten glass.

The invention claimed is:

1. A heating device state monitoring method for a heating device, the heating device including a conductive path that electrically series-connects heating elements and a power supply that supplies power to the conductive path, the method comprising:
   an initial potential difference acquisition step including:
      determining a first initial potential difference of a first conductive path portion of a plurality of conductive path portions that includes at least one of the heating elements;
      determining a second initial potential difference of a second conductive path portion of the plurality of conductive path portions;
   comparing the first initial potential difference with the second initial potential difference to determine a first comparison information;
   after the initial potential difference acquisition step, a later potential difference acquisition step that obtains a potential difference of the plurality of conductive path portions, including:
      a first potential difference acquisition step that obtains a first potential difference of the first conductive path portion; and
      a second potential difference acquisition step that obtains a second potential difference of the second conductive path portion that differs from the first conductive path portion;
   a monitoring information acquisition step that obtains monitoring information used to monitor a state of the heating elements, wherein the monitoring information includes a second comparison information obtained by comparing the first potential difference and the second potential difference; and
   an anomaly determination step that determines occurrence of an anomaly in the plurality of conductive path portions based on the monitoring information obtained in the monitoring information acquisition step, and a comparison between the first comparison information and the second comparison information.

2. The heating device state monitoring method according to claim 1, wherein one of the first conductive path portion and the second conductive path portion includes two or more of the heating elements.

3. The heating device state monitoring method according to claim 1, wherein the first conductive path portion and the second conductive path portion each include two or more of the heating elements.

4. The heating device state monitoring method according to claim 3, the method further comprises:
   an individual potential difference acquisition step that obtains an individual potential difference of each of the heating elements included in the first conductive path portion or the second conductive path portion that is determined as being anomalous in the anomaly determination step; and
   an identification step that identifies a heating element that needs to be replaced or repaired based on the potential differences of the heating elements obtained in the individual potential difference acquisition step.

5. The heating device state monitoring method according to claim 4, wherein the anomaly determination step determines whether there is spark generation precursory indication in any one of the heating elements of the first conductive path portion and the second conductive path portion.

6. The heating device state monitoring method according to claim 1, wherein the heating device is used to heat glass.

7. A state monitoring system for a heating device, the heating device including a conductive path that electrically series-connects heating elements and a power supply that supplies power to the conductive path, the state monitoring system comprising:
   an initial potential difference acquisition step including:
      determining a first initial potential difference of a first conductive path portion of a plurality of conductive path portions that includes at least one of the heating elements;
      determining a second initial potential difference of a second conductive path portion of the plurality of conductive path portions;
   comparing the first initial potential difference with the second initial potential difference to determine a first comparison information;
   after the initial potential difference acquisition step, a later potential difference acquisition unit that obtains a potential difference of the plurality of conductive path portions, including:
      a first potential difference acquisition step that obtains a first potential difference of the first conductive path portion; and
      a second potential difference acquisition step that obtains a second potential difference of the second conductive path portion that differs from the first conductive path portion;
   a monitoring information acquisition unit that obtains monitoring information used to monitor a state of the heating elements, wherein the monitoring information includes a second comparison information obtained by comparing the first potential difference and the second potential difference; and
   an anomaly determination unit that determines occurrence of an anomaly in the plurality of conductive path portions based on the monitoring information obtained by the monitoring information acquisition unit, and a comparison between the first comparison information and the second comparison information.

\* \* \* \* \*